United States Patent [19]
Barringer

[11] Patent Number: 5,788,323
[45] Date of Patent: Aug. 4, 1998

[54] TRUCK GUTTER SYSTEM

[75] Inventor: Mark Barringer, Richmond, Calif.

[73] Assignee: Richmond Wholesale Meat Co., Richmond, Calif.

[21] Appl. No.: 799,006

[22] Filed: Feb. 7, 1997

[51] Int. Cl.$^6$ .................................................. B60J 1/20
[52] U.S. Cl. ........................................ 296/208; 296/154
[58] Field of Search .................................. 296/208, 154, 296/183, 146.1, 152, 213; 160/44, DIG. 3

[56] References Cited

U.S. PATENT DOCUMENTS

| | | | |
|---|---|---|---|
| 2,635,918 | 4/1953 | Muckle | 296/154 X |
| 2,930,652 | 3/1960 | Bidlingmaier et al. | 296/213 |
| 3,050,335 | 8/1962 | Schubach | 296/213 |
| 4,332,415 | 6/1982 | Williams | 296/213 |
| 4,685,718 | 8/1987 | Steenblik et al. | 296/154 |
| 4,923,241 | 5/1990 | Miller | 296/154 |
| 5,460,425 | 10/1995 | Stephens | 296/154 X |

FOREIGN PATENT DOCUMENTS

| 4023823 | 1/1992 | Germany | 207/154 |
|---|---|---|---|

*Primary Examiner*—Joseph D. Pape
*Attorney, Agent, or Firm*—Malcolm B. Wittenberg

[57] ABSTRACT

A gutter for a truck having a roof over a cargo storage area. The gutter is employed for channeling water which would cascade from the roof of the truck's rear opening. The gutter includes a clip for removably attaching it to the roof of the truck and a channel for capturing water and directing the water to at least one side of the cargo storage area.

7 Claims, 2 Drawing Sheets

TRUCK GUTTER SYSTEM

TECHNICAL FIELD OF THE INVENTION

The present invention deals with a gutter system removably attachable to the roof of a truck's cargo storage area in order to minimize rain water cascading from the roof during the loading and unloading of the vehicle at an appropriate loading dock. Water which would otherwise spill over the open rear cargo area is directed to one side of the vehicle and onto the roadway.

BACKGROUND OF THE INVENTION

Countless numbers of unrelated businesses provide a dedicated location for receiving commercial vehicles, such as semi-tractor trailers, for the delivery of goods. From manufacturing facilities to grocery stores and supermarkets, loading docks are provided which consist of a raised platform and overhead doors for receiving the back end of a semi-tractor trailer truck. It is contemplated that the raised platform be of a height of an average semi-tractor trailer truck bed so that product can be moved directly from the truck bed onto the loading platform via a suitable ramp and into a receiving area.

Although the unloading of semi-tractor trailer vehicles is a common everyday occurrence, the procedure becomes inconvenient when weather is inclement. Oftentimes, rain water collects on the roof of the vehicle's cargo storage area and cascades over the roof between the space created between the cargo storage area of the vehicle and the overhead doors of the loading dock. When this occurs, not only are dock workers potentially subjected to sheets of cascading water but merchandise being unloaded can also become saturated and, in some cases where the product is water sensitive, the integrity of the cargo can be jeopardized.

Although it might seem an obvious expedient to incorporate some type of lip or dam on the upper rear edge of the truck cargo area to prevent the cascading of rain water, designers of semi-tractor trailer vehicles are hesitant to attach any protrusion to the vehicle surface as such an expedient would increase the vehicle's drag coefficient resulting in a loss of fuel economy.

In light of the above discussion, it is an object of the present invention to provide a means of minimizing the cascading of rain water over the rear roof area of a cargo vehicle during loading and unloading by a means which need only be temporarily attached to the vehicle body and removed once the transfer of cargo from the vehicle to the loading dock has been completed.

These and further objects would be more readily apparent when considering the following disclosure and appended claims.

SUMMARY OF THE INVENTION

The present invention is directed to a gutter for a truck having a roof over a cargo storage area. The gutter is employed for channeling water which would cascade from the roof of the truck's rear opening. The gutter comprises at least one clip for removably attaching the gutter to the roof and a tray for capturing water and directing the water to at least one side of the cargo storage area.

DETAILED DESCRIPTION OF THE INVENTION

Figure 1:
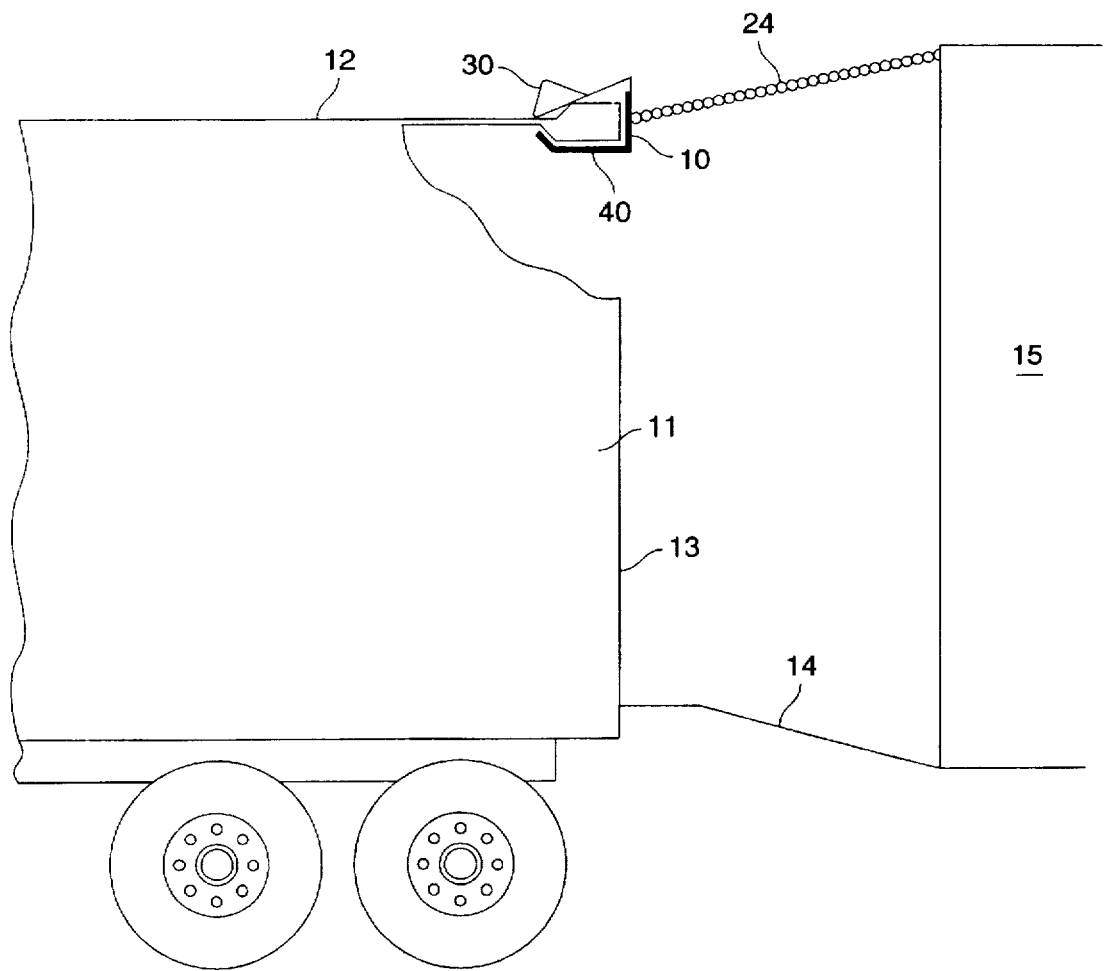
FIG. 1 is a side view of a vehicle having the present invention appended thereto.

Turning first to FIG. 1 of the present invention, gutter assembly 10 is shown being attached to roof 12 of cargo storage area 11, typically of a semitractor trailer vehicle. Cargo is generally unloaded from the vehicle over ramp 14 and into receiving area 15, again shown in FIG. 1. Ideally, the gutter assembly 10 can be connected to a receiving station 15 via attachment means 24, such as by wire or chain, so that in the event that the unloaded vehicle is caused to pull away from the loading station prior to removing the gutter, attachment means 24 will, in effect, pull the gutter away from the back of the truck so that it remains with the dock operator and not with the vehicle.

Figure 3:
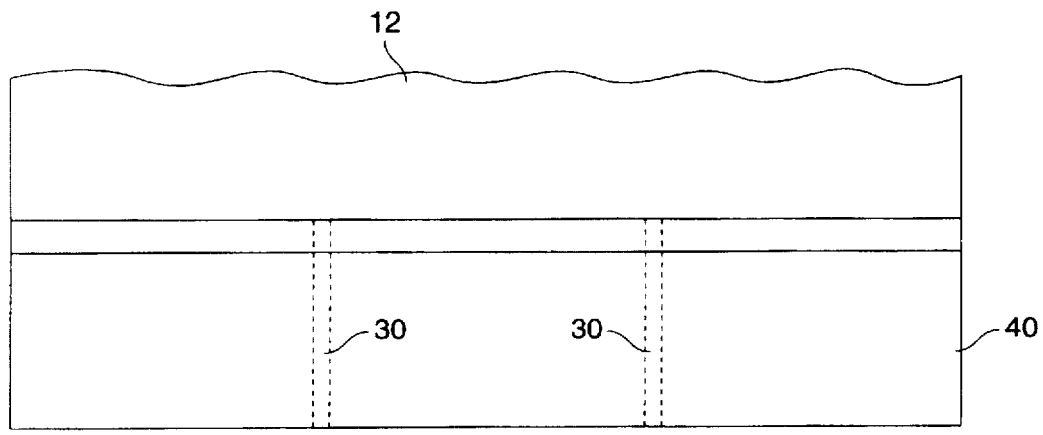
FIG. 3 is a top view of the present invention shown appended to a cutaway view of the roof of a truck cargo area.

The present invention actually consists of two component parts, one of said parts being a clip-on section 30 and the other being the gutter assembly 40. Both the clip on section and gutter assembly can be composed of bent sheet metal such as aluminum or galvanized steel or of plastic. As noted by making reference to FIG. 3, gutter assembly 40 is generally sized to extend throughout the width of cargo roof 12. Typically, the gutter assembly 40 is maintained at the rear edge of roof 12 by means of clip-on sections 30, shown in FIG. 3 as consisting of two parallel segments (in phantom). At least one clip-on section must be used to maintain the gutter assembly at the rear edge of roof 12 of the vehicle although more than two clip-on sections can be employed. Applicant has found, in most installations, two such sections are all that is required to maintain the gutter assembly in a fixed but removable orientation to roof 12 of the vehicle.

Figure 2:
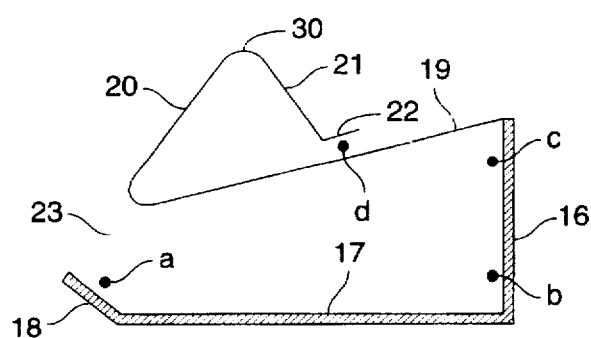
FIG. 2 is a side view of the hanger used as part of the present invention.

The composite of gutter assembly 40 with clip-on section 30 can best be seen by reference to FIG. 2. Clip-on section 30 is shown as consisting of vertical leg 16, horizontal leg 17 and turned up section 18. As noted in FIG. 1, the combination of clip-on section 30 with gutter assembly 40 provides for a frictional engagement whereby roof section 12 fits within the assembly of the present invention through opening 23 (FIG. 2) where the gutter assembly remains until physical removal is carried out.

Figure 4:
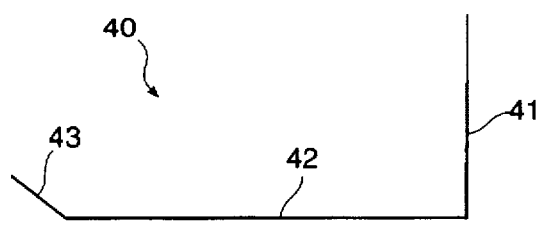
FIG. 4 is a side view of the gutter used as part of the present invention.

As noted by reference to FIG. 2, segments 16, 17, 18, 19, 20, 21 and 22 make up clip-on section 30. The gutter section as shown in FIG. 4 is made up of sections 41, 42 and 43. As again noted by reference to FIG. 2, the gutter assembly 40 is attached to clip-on section 30 via screws a, b and c. Further, short segment 22 of clip-on section 30 can be attached to section 19 thereof through the use of screw d. The attachment means 24 (FIG. 1) can be conveniently connected anywhere along clip-on section 30 to maintain the composite clip-on section and gutter assembly with the loading dock operator in the event that a cargo vehicle was to inadvertently pull away from the cargo area while the present invention was still attached thereto. When not in use, the present gutter assembly can be hooked or otherwise removably attached to the cargo receiving area.

It is further contemplated in practicing the present invention that, in the event that two clip-on sections 30 are employed, that segment 16 be of different length in each section in order to angle the gutter to horizontal to direct captured rain water to one side of the vehicle spilling the rain water onto an adjacent roadway.

In practicing the present invention, although loading dock employees as well as cargo may be continue to be impacted by rain water as a result of a cargo vehicle's inability to abut the cargo loading dock area, in the practice of the present invention, falling rain is all that will impact workers and their cargo. No longer will one have to contend with accumulated rain water cascading over the roof of the cargo area at the vehicle's rear cargo opening.

I claim:

1. A gutter for a truck having a roof over a cargo storage area and a rear opening, said gutter being employed for channeling water which would cascade from the roof of the truck's rear opening, said gutter comprising at least one clip for removably attaching the gutter to said roof and a gutter channel sized to extend across the entire roof at said rear opening for capturing water and directing the water to at least one side of said cargo storage area.

2. The gutter of claim 1 wherein said clip and channel are composed of bent sheet metal.

3. The gutter of claim 2 wherein said sheet metal is aluminum.

4. The gutter of claim 2 wherein said sheet metal is galvanized steel.

5. The gutter of claim 1 wherein said clip and channel are composed of plastic.

6. A gutter for a truck having a roof over a cargo storage area and a rear opening, said gutter being employed for channeling water which would cascade from the roof of the truck's rear opening, said gutter comprising at least one clip for removably attaching the gutter to said roof and a gutter channel for capturing water and directing the water to at least one side of said cargo storage area and further comprising means for attaching said gutter to a cargo receiving area, said gutter being selectively removable from said cargo receiving area when needed to attach to a truck and maintained by said cargo receiving area when not in use.

7. The gutter of claim 6 wherein said gutter remains connected to said cargo receiving area such that movement of said truck away from said cargo receiving area while said gutter is attached to said truck results in dislodgement of said gutter from said truck and continued attachment of said gutter to said cargo receiving area.

* * * * *